United States Patent [19]

Kozakura et al.

[11] Patent Number: 5,314,949
[45] Date of Patent: May 24, 1994

[54] POLYCARBONATE RESIN COMPOSITION

[75] Inventors: Shiro Kozakura; Shigeki Kuze; Kenji Tanaka, all of Ichihara, Japan

[73] Assignee: Idemitsu Petrochemical Co., Ltd., Tokyo, Japan

[21] Appl. No.: 28,366

[22] Filed: Mar. 9, 1993

Related U.S. Application Data

[63] Continuation-in-part of Ser. No. 820,206, Jan. 13, 1992, abandoned.

[30] Foreign Application Priority Data

Jan. 24, 1991 [JP] Japan .................. 3-022664
Mar. 13, 1992 [JP] Japan .................. 4-055199

[51] Int. Cl.$^5$ .................. C08L 69/00; C08L 67/02
[52] U.S. Cl. .................. 525/67; 525/439
[58] Field of Search .................. 525/67, 439

[56] References Cited

U.S. PATENT DOCUMENTS

| | | | |
|---|---|---|---|
| 2,866,771 | 12/1958 | Sellers et al. | |
| 2,971,939 | 2/1961 | Baer et al. | |
| 3,544,514 | 12/1970 | Schnell | 528/204 |
| 4,001,184 | 1/1977 | Scott | |
| 4,415,723 | 11/1983 | Hedges et al. | 528/204 |
| 4,436,879 | 3/1984 | Miller | 525/439 |
| 4,515,925 | 5/1985 | Kleiner | 525/439 |
| 4,652,602 | 3/1987 | Liu | 524/449 |
| 4,710,534 | 12/1987 | Liu | 525/67 |
| 4,788,251 | 11/1988 | Brown | 525/148 |
| 4,866,123 | 9/1989 | Wittmann | 525/67 |
| 5,008,330 | 4/1991 | Laughner | 525/67 |
| 5,068,285 | 11/1991 | Laughner | 525/67 |
| 5,087,663 | 1/1992 | Laughner | 525/67 |
| 5,087,665 | 2/1992 | Chung | 525/133 |
| 5,104,964 | 4/1992 | Kuze | 528/202 |

FOREIGN PATENT DOCUMENTS

| | | |
|---|---|---|
| 675110 | 7/1966 | Belgium . |
| 1238164 | 6/1988 | Canada . |
| 0106225 | 4/1984 | European Pat. Off. . |
| 0120394 | 10/1984 | European Pat. Off. . |
| 0131196 | 1/1985 | European Pat. Off. . |
| 0400478 | 12/1990 | European Pat. Off. . |
| 44-17149 | 7/1969 | Japan . |
| 59-45318 | 3/1984 | Japan . |
| 60-11733 | 3/1985 | Japan . |
| 3-182524 | 8/1991 | Japan . |

Primary Examiner—David Buttner
Attorney, Agent, or Firm—Frishauf, Holtz, Goodman & Woodward

[57] ABSTRACT

A polycarbonate resin composition comprising 1 to 99% by weight of a branched polycarbonate having a branched nucleus structure derived from a branching agent represented by the general formula:

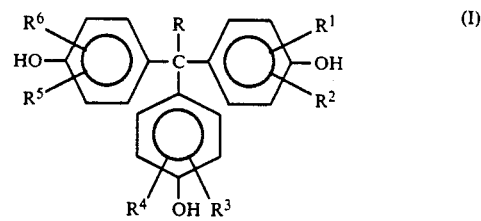

wherein R is a hydrogen atom or an alkyl group having 1 to 5 carbon atoms, and $R^1$ to $R^6$ are hydrogen atoms, alkyl groups having 1 to 5 carbon atoms or halogen atoms, respectively, and 99 to 1% by weight of a thermoplastic polyester resin. The polycarbonate resin composition is excellent in fluidability, solvent resistance and moldability.

8 Claims, No Drawings

POLYCARBONATE RESIN COMPOSITION

REFERENCE TO RELATED APPLICATION

This application is a continuation-in-part application of application Ser. No. 07/820,206 filed Jan. 13, 1992 now abandoned.

BACKGROUND OF THE INVENTION

1. Field of the Invention

The present invention relates to a polycarbonate resin composition, and more particularly to a polycarbonate resin which has an improved fluidability and solvent resistance in addition to the mechanical properties of conventional polycarbonate resin compositions, and is excellent in moldability, particularly in blow moldability.

2. Description of the Related Arts

Processes for production of polycarbonate using phloroglucine or trimellitic acid as a branching agent have heretofore been known, as disclosed in for example, Japanese Patent Publication Nos. 17149/1969, and 11733/1985. Use of these branching agents, however, suffers from a disadvantage in that a trace amount of unreacted matter is apt to cause coloring.

In Japanese Patent Application Laid-Open No. 45318/1984, 1,1,1-tris(4-hydroxyphenyl)ethans is proposed to be used as a branching agent. However, the specification of U.S. Pat. No. 4,415,723 discloses that the polymer obtained by using this branching agent is colored to pals yellowish green in Comparative Example A, and suggests the use of a branching agent such as 1,1,2-tris(4-hydroxyphanyl)ethans and 1,1,2-tris(4-hydroxyphenyl)propane. Yet the process disclosed in the above U.S. Pat. No. 4,415,723 cannot completely solve the problems of coloring.

It is known that when a polycarbonate is branched for blow molding, its impact resistance decreases. Accordingly, development of a branched polycarbonate with high impact resistance had been required.

The present inventors' group had investigated from such points of view, and succeeded in solving the problem of hue to develop a branched polycarbonate suitable for blow molding which have acetone-soluble matter of not more than 3.5% by weight and an improved impact-strength (Japanese Patent Application Laid-open No. 182524/1991).

SUMMARY OF THE INVENTION

As a result of present inventors' intensive investigations to further improve moldability and solvent resistance of the above-mentioned branched polycarbonate, it has been found that a polycarbonate resin composition having the desired properties can be obtained by means of blending a prescribed amount of thermoplastic polyester resin with a specified polycarbonate, without imparing the mechanical properties of conventional polycarbonate resin composition.

The present invention has been accomplished based on the above findings. That is, the present invention provides a polycarbonate resin composition comprising (A) 1 to 99% by weight of a branched polycarbonate having a branched nucleus structure derived from a branching agent represented by the general formula (I):

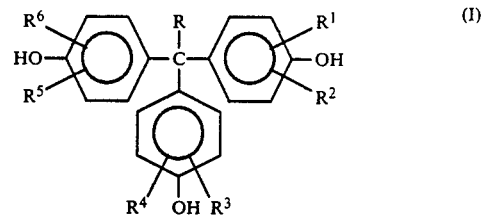

wherein R is a hydrogen atom or an alkyl group having 1 to 5 carbon atoms, and $R^1$ to $R^6$ are hydrogen atoms, alkyl groups having 1 to 5 carbon atoms or halogen atoms, respectively, a viscosity average molecular weight of 15,000 to 40,000, and an acetone soluble matter of not more than 3.5% by weight, and (B) 99 to 1% by weight of a thermoplastic polyester resin.

The polycarbonate resin composition may comprise 40 to 94% by weight of the component (A) and 5 to 59% by weight of the component (B) and further comprise 1 to 50% of a rubber elastomer as a component (C).

DESCRIPTION OF THE PREFERRED EMBODIMENTS

The branched polycarbonate of component (A) of the present invention has a branched nucleus structure derived from a branching agent represented by the general formula (I):

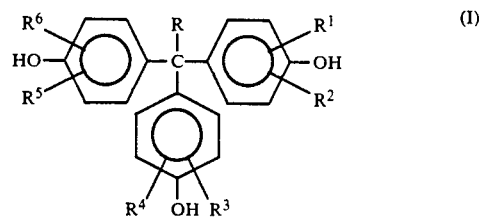

wherein R is a hydrogen atom, an alkyl group having 1 to 5 carbon atoms, such as methyl group, ethyl group, n-propyl group, n-butyl group, and n-pentyl group; and $R^1$ to $R^6$ are hydrogen atoms, alkyl groups having 1 to 5 carbon atoms (e.g., methyl group, ethyl group, n-propyl group, n-butyl group, and n-pentyl group) or halogen atoms (e.g., chlorine atom, bromine atom, and fluorine atom).

The embodiments of the branching agent of the general formula (I) include
1,1,1-tris(4-hydroxyphenyl)methane;
1,1,1-tris(4-hydroxyphenyl)ethane;
1,1,1-tris(4-hydroxyphenyl)propane;
1,1,1-tris(2-methyl-4-hydroxyphenyl)methane;
1,1,1-tris(2-methyl-4-hydroxyphenyl)ethane;
1,1,1-tris(3-methyl-4-hydroxyphenyl)methane;
1,1,1-tris(3-methyl-4-hydroxyphenyl)ethane;
1,1,1-tris(3,5-dimethyl-4-hydroxyphenyl)methane;
1,1,1-tris(3,5-dimethyl-4-hydroxyphenyl)ethane;
1,1,1-tris(3-chloro-4-hydroxyphenyl)methane;
1,1,1-tris(3-chloro-4-hydroxyphenyl)ethane;
1,1,1-tris(3,5-dichloro-4-hydroxyphenyl)methane;
1,1,1-tris(3,5-dichloro-4-hydroxyphenyl)ethane;
1,1,1-tris(3-bromo-4-hydroxyphenyl)methane;
1,1,1-tris(3-bromo-4-hydroxyphenyl)ethane;
1,1,1-tris(3,5-dibromo-4-hydroxyphenyl)methane; and
1,1,1-tris(3,5-dibromo-4-hydroxyphenyl)ethane.

The above branched polycarbonate posesses the branched nucleus structure derived from a branching agent represented by the above-mentioned general formula (I), and specifically represented by the following formula:

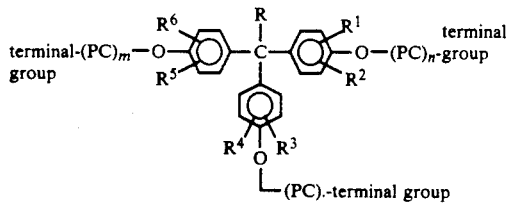

wherein m, n and o are integers, and PC represents a polycarbonate moiety.

The polycarbonate represents, when bisphenol A is used as starting material component, for instance, a repeating unit of the following formula:

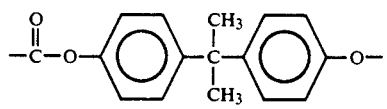

The branched polycarbonate of Component (A) has a specified branched nucleus structure as described above, and a viscosity average molecular weight of 15,000 to 40,000. If the viscosity average molecular weight is less than 15,000, impact resistance of the resulting composition is low, while if it is in excess of 40,000, moldability of the composition results to be poor.

In the above branched polycarbonate, the portion of acetone soluble matter is preferably not more than 3.5% by weight. If the portion of acetone-soluble matter exceeds 3.5% by weight, impact resistance of the composition becomes to be markedly low. The acetone-soluble matter therein refers to a component extracted from the objective polycarbonate by Soxhlet extraction using acetone as a solvent.

Above-mentioned branched polycarbonate can be produced according to various processes. For example, the branched polycarbonate can be efficiently produced by a process disclosed in Japanese Patent Application Laid-Open No. 182524/1991, which comprises reacting (i) a polycarbonate oligomer derived from aromatic dihydric phenols, a branching agent represented by the general formula (I), and phosgene, (ii) aromatic dihydric phenols, and (iii) a terminal stopper while stirring in such a way that a reaction mixture containing them is under a turbulent flow condition, and adding aqueous alkali solution at the point where the viscosity of the reaction mixture rises and, at the same time, reacting the reaction mixture under a laminar flow condition.

The branched polycarbonate can also be produced by reacting (i) a polycarbonate oligomer derived from aromatic dihydric phenols and phosgene, (ii) aromatic dihydric phenols, (iii) a branching agent represented by the general formula (I), and (iv) a terminal stopper while stirring so that a reaction mixture containing them is under a turbulent flow condition, and adding aqueous alkali solution at the point where the viscosity of the reaction mixture increases and, at the same time, reacting the reaction mixture under a laminar flow condition.

As a thermoplastic polyester resin as Component (B) of the present invention, various ones can be used. As the preferred examples, a polyester resin obtained by polymerization of a bifunctional carboxylic acid component and an alkylene glycol component is suggested.

Examples of bifunctional carboxylic acid components and alkylene glycol components are as follows. Bifunctional carboxylic acid components include aromatic dicarboxylic acids such as terephthalic acid, isophthalic acid, and naphthalene dicarboxylic acid. Among these dicarboxylic acids, terephthalic acid is preferred. Other bifunctional carboxylic acid components can also be used in combination so long as the effect of the present invention is not impaired. Typical examples of the other bifucntional carboxylic acid are aliphatic dicarboxylic acids such as oxalic acid, malonic acid, adipic acid, suberic acid, azelaic acid, sebacic acid, and decanedicarboxylic acid, and ester forming derivatives thereof. The proportion of the dicarboxylic acid component other than aromatic dicarboxylic acids is preferably 20% or less of the total dicaroboxylic acids.

The alkylene glycol component is not critical, but specifically aliphatic diols having 2 to 15 carbon atoms such as ethylene glycol, propylene-1,2-glycol, propylene-1,3-glycol, butylene-1,4-glycol, butylene-2,3-glycol, hexane-1,6-diol, octane-1,8-diol, neopentyl glycol, and decane-1,10-diol can be used. Among these diols, ethylene glycol and butylene glycol are preferred.

As the polyester resins, particularly preferred ones are polyethylene terephthalate and polybutylene terephthalate.

The thermoplastic polyester resin as component (B) can be prepared by a conventional method in the presence or absence of a polycondensation catalyst containing titanium, germanium, antimony or the like. For example, polyethylene terephthalate can be prepared by the reaction comprising two steps. At the first step, terephthalic acid and ethylene glycol are esterified, or a lower alkyl ester of terephthalic acid such as dimethyl terephthalate and ethylene glycol are transesterified to obtain a glycol ester of terephthalic acid and/or a low polymer thereof. At the second step, that is, polymerization reaction step, the glycol ester and/or a low polymer thereof are further polymerized to give a polymer having a high polymerization degree.

In the composition of the present invention, the proportion of the branched polycarbonate as Component (A) is 1 to 99% by weight, preferably 30 to 98% by weight, to the total amount of Components (A) and (B). The thermoplastic polyester resin as Component (B) is incorporated in a proportion of 99 to 1% by weight, preferably 70 to 2% by weight. If the proportion of the branched polycarbonate exceeds 99% by weight, the resulting composition is not improved sufficiently in fluidability and solvent resistance. On the other hand, if the proportion of the above-mentioned branched polycarbonate is less than 1% by weight, the mechanical strength and the moldability of the composition are lowered, and no effect by branching the polycarbonate is obtained.

Various compounds can be used as a rubber elastomer of the component (C) . Examples of the rubber elastomer include (1) those prepared by polymerizing one or more vinyl-based monomers in the presence of a rubber polymer obtained from monomers mainly comprising either or both of an alkyl acrylate and an alkyl methacrylate. The alkyl acrylate and the alkyl methacrylate each preferably has 2 to 10 carbon atoms, specific examples of which include an ethyl acrylate, a butyl acrylate, a 2-ethylhexyl acrylate, a non-octyl methacrylate and the like.

Examples of the rubber polymer made from monomers mainly comprising these alkyl acrylates include polymers obtained by reacting 70% by weight or more of said alkyl acrylates with 30% by weight or less of copolymerizable other vinyl-based monomers such as methyl methacrylate, acrylonitrile, vinyl acetate, and styrene. Polyfunctional monomers such as divinyl benzene, ethylene dimethacrylate, triallylcyanurate and triallyl isocyanurate may be added in a proper amount as a crosslinking agent in this reaction.

Examples of the vinyl-based monomer which is reacted in the presence of said rubber polymer include an aromatic vinyl compound such as styrene and a-methyl styrene, an acrylic ester such as methyl acrylate and ethyl acrylate, a methacrylic ester such as methyl methacrylate and ethyl methacrylate and the like.

These monomers may be used singly or two or more in mixtures. The monomers may also be copolymerized with other vinyl-based monomers, for example, a vinyl cyanide compound such as acrylonitrile and methacrylonitrile, a vinyl ester compound such as vinyl acetate and vinyl propionate and the like.

The polymerization can be conducted according to various methods such as bulk polymerization, suspension polymerization and emulsion polymerization. Particularly emulsion polymerization is suitable.

The so obtained rubber elastomer contains preferably 20% by weight or more of said rubber component. Specific examples of this rubber elastomer include a MAS resin elastomer, for example, a graft copolymer combining 60 to 80% by weight of a n-butyl acrylate with a styrene or a methyl methacrylate.

Said MAS resin elastomer is commercially available, for example as "KM-330" (tradename, supplied by Rhome & Haas Co.), as "METABLEN W 529" (tradename, supplied by Mitsubishi Rayon Co., Ltd.) and the like.

Other examples of said rubber elastomer are (2) those prepared by polymerizing one or more of vinyl-based monomers with a copolymer which is obtained by copolymerizing either or both of an alkyl acrylate and an alkyl methacrylate and a polyfunctional monomer having a conjugated diene-type double bond. The alkyl acrylate and the alkyl methacrylate are the same as exemplified in (1) above. Examples of the polyfunctional monomer having the conjugated diene type double bond are a conjugated diene compound such as butadiene and isoprene and a compound having a conjugated diene type double bond and further a non-conjugated double bond per molecule. They are for example, 1-methyl-2-vinyl-4,6-heptadiene-1-ol; 7-methyl-3-methylene-1,6-octadiene; 1,3,7-octatriene; and the like.

In said process wherein either or both of the alkyl acrylate and alkyl methacrylate are copolymerized with the polyfunctional monomer having the conjugated diene type double bond, a vinyl-based monomer may be added, if necessary, including an aromatic vinyl compound such as a-methyl styrene, a vinyl cyanide compound such as acrylonitrile and methacrylonitrile, a vinyl ester compound such as vinyl acetate and vinyl propionate, a vinyl ether compound such as methylvinyl ether and a halogenated vinyl compound such as vinyl chloride. Furthermore, a crosslinking agent such as ethylene dimethacrylate and divinyl benzene may as well be added.

The so obtained copolymers are polymerized with the vinyl-based monomers which are same as exemplified in (1) above. These monomers may be used singly or two or more in mixtures. The polymerization can be conducted according to various methods such as bulk polymerization, suspension polymerization and emulsion polymerization. Particularly emulsion polymerization is suitable.

Preferred among these rubber elastomers is a graft copolymer obtained as follows: an alkyl(meth)acrylate such as n-butyl acrylate, 2-ethylhexyl acrylate or methyl methacrylate, a butadiene and further a small amount of a crosslinking agent such as ethylene dimethacrylate or divinyl benzene are copolymerized according to a conventional method; to the resultant latex, vinyl-based monomers such as styrene, acrylonitrile, methacrylonitrile or vinyl chloride are added as the graft component monomer and the mixture is subjected to graft polymerization according to a conventional method.

Another preferred rubber elastomer is a graft copolymer obtained as follows: said alkyl (meth)acrylate and a compound having a conjugated diene type double bond and further a non-conjugated double bond per molecule are copolymerized according to a conventional method, to the resultant latex said vinyl-based monomers are added as the graft component monomer and the mixture is subjected to graft polymerization according to a conventional method. This graft polymerization is conducted either in a single step process or in a process consisting of a plurality of steps dealing with the graft component monomers one by one.

Specific examples of these rubber elastomers are MABS resin elastomers including a graft copolymer wherein an octyl acrylate and a butadiene are copolymerized at a ratio of 7:3, to the resultant rubber latex styrene and a methyl methacrylate are added and the mixture is subjected to graft polymerization.

Still other examples of the rubber elastomer includes those obtained by copolymerizing two or more of compounds selected from the group consisting of a methacrylic ester monomer, a vinyl cyanide monomer and an aromatic vinyl monomer in the presence of a rubber.

Various rubbers can be used herein. Specifically, they are a diene rubber or a diene rubber mixture, for example, a butadiene rubber (BR), an isoprene rubber (IR), a chloroprene rubber (CR), a piperylene rubber, a styrene-butadiene copolymer rubber, a styrene-butadiene block copolymer rubber, an acrylonitrile-butadiene copolymer rubber (NBR) and further an ethylene-propylene rubber (EPR), a terpolymer wherein an ethylene and a small amount of a diene are copolymerized (EPT), an isobutylene-isoprene rubber (IIR), an ethylene-vinyl acetate rubber, a polyethylene chloride rubber, an epichlorohydrin rubber and the like. Of them, the butadiene rubber (BR) and the styrene-butadiene rubber (SBR) are particularly suitable.

Furthermore, various compounds can be used as the methacrylic ester monomer, examples of which include a methyl methacrylate, an ethyl methacrylate, a propyl methacrylate, an isopropyl methacrylate, a butyl methacrylate and the like. Of them, the methyl methacrylate is particularly suitable.

Furthermore, examples of the vinyl cyanide monomer include an acrylonitrile, a methacrylonitrile and the like.

Moreover, specific examples of the aromatic vinyl monomer include a styrene, an a-methyl styrene, an o-methyl styrene, a m-methyl styrene, a p-methyl styrene, a dimethyl styrene, a chlorostyrene and the like.

Other than those mentioned above, rubber elastomers for use in the present invention include a thermoplastic resin obtained by copolymerizing two or more compounds selected from the group consisting of those such methacrylic ester monomers, vinyl cyanide monomers and aromatic vinyl monomers according to a known method such as solution polymerization, bulk polymerization, suspension polymerization, bulk-suspension polymerization and emulsion polymerization. Particularly, a thermoplastic resin having a high rubber content is preferably manufactured according to the emulsion graft polymerization. Specifically, a methacrylic ester monomer and an aromatic vinyl monomer are polymerized with a polybutadiene-based latex according to the emulsion graft polymerization and the resultant polybutadiene-based copolymer latex is coagulated with an inorganic acid or an inorganic salt such as aluminum sulfate to obtain the desired product.

Preferred among those obtained as described above is a thermoplastic resin prepared by copolymerizing a styrene-methyl methacrylate or a styrene-acrylonitrile in the presence of a butadiene copolymer containing 30% by weight or more of a polybutadiene or a butadiene. Meanwhile, the above styrene compounds may be those in which a part or all of the styrene is substituted with an α-methyl styrene. Preferred specific examples of those styrene compounds include a methyl methacrylate-butadiene-styrene resin (MBS resin), an acrylonitrile-butadiene-styrene resin (ABS resin) and the like.

The present invention provides a polycarbonate resin composition comprising the abovementioned components (A), (B) and (C). The components (A), (B) and (C) are mixed at a ratio of 40 to 94% by weight, preferably 45 to 80% by weight of (A), 5 to 59% by weight, preferably 10 to 40% by weight of (B) and 1 to 50% by weight, preferably 3 to 30% by weight of (C).

In the polycarbonate resin composition of the present invention, various inorganic fillers, additives or other synthetic resins, elastomers and the like can, if necessary, blended so long as the purpose of the present invention is not impaired.

Inorganic fillers blended in order to improve the mechanical strength, the durability, or the increase in quantity of the polycarbonate resin composition include glass fibers (GF), glass beads, glass flakes, carbon black, calcium sulfate, calcium carbonate, calcium silicate, titanium oxide, alumina, silica, asbestos, talc, clay, mica, and quartz powder.

The aforementioned additives include anti-oxidizing agents of hindered phenol type, phosphorus type such as phosphite and phosphate, and amine type; UV absorbers such as benzotriazoles, and benzophenones; external lubricating agents such as aliphatic carboxylates, and paraffines; conventional flame-retardants; mold release agents: antistatic agents: colorants and the like.

As the hindered phenol type anti-oxidizing agents, BHT (2,6-di-tert-butyl-p-cresol), Irganox 1076 and Irganox 1010 (trade name, produced by CIBA-GEIGY CO. ), Ethyl 330 (trade name, produced by ETHYL CO.), Sumilizer GM (trade name, produced by SUMITOMO CHEMICAL CO., LTD. ) and the like are preferably used.

Examples of the other synthetic resins are polyethylene, polypropylene, polystyrene, acrylonitrile-styrene (AS) resin, acrylonitrile-butadiene-styrene (ABS) resin, polymethyl methacrylate, and polycarbonates other than the above-mentioned branched polycarbonate. Examples of elastomers are isobutylene-isoprene rubber, styrene-butadiene rubber, ethylene-propylene rubber, acrylic elastomer and the like.

The polycarbonate resin composition of the present invention can be prepared by blending the above-mentioned components and kneading them. Blending and kneading can be conducted by a conventional method with the use of a ribbon blender, a Henschel mixer, a Bunbury mixer, a drum tumbler, a single screw extruder, a twin screw extruder, a co-kneader, a multiple screw extruder or the like. The Kneading is appropriately conducted at a heating temperature usually in the range of 250° to 300° C.

The polycarbonate resin composition thus obtained can be molded by various conventional molding methods such as injection molding, hollow molding, extrusion molding, compression molding, calender molding, and rotary molding to prepare molded products such as a bumper and other parts for automobiles, molded products for home electrical appliances, etc. The polycarbonate resin composition is suited particularly for blow molding and extrusion molding, and is excellent in vacuum moldability, hollow moldability, and heat bending moldability in the form of sheet or film.

As described above, according to the present invention, a polycarbonate resin composition excellent in fluidability and solvent resistance, and also in moldability, while posessing the mechanical properties of the original polycarbonate can be obtained. The above-mentioned polycarbonate is particularly suitable for blow molding. Accordingly, blow molding products made from the polycarbonate resin composition of the present invention has a markedly improved mechanical properties and solvent resistance, compared with the conventional ones. Therefore, the polycarbonate resin composition of the present invention is effectively utilized for various molding products (e.g., industrial materials for automobiles, home electric appliances, and office automation appliances), particularly as the material for blow molding.

The present invention will be explained in greater detail with reference to the following examples and comparative examples.

REFERENCE EXAMPLE (1) Synthesis of Polycarbonate Oligomer A 60 kg of bisphenol A was dissolved in 400 L (L=liter) of a 5% aqueous sodium hydroxide solution to prepare an aqueous sodium hydroxide solution of bisphenol A.

Subsequently, the aqueous sodium hydroxide solution of bisphenol A maintained at room temperature was introduced into a tubular reactor with an inner diameter of 10 mm and tube length of 10 m through an orifice plate at a flow rate of 138 L /hr, and methylene chloride was introduced therein at a flow rate of 69 L /hr, and phosgene was blown thereinto in parallel at a flow rate of 10.7 kg/hr to continuously react them for 3 hours. The tubular reactor used herein was a double tube, and the discharge temperature of the reaction solution was maintained at 25° C. by passing cooling water in the jacket section.

The discharged liquid (the reaction solution) was adjusted to pH 10 to 11. The reaction solution thus obtained was allowed to stand, and thus the aqueous layer was separated and removed to obtain 220 L of the methylene chloride layer. Further, 170 L of methylene chloride was added to the methylene chloride layer, and the resulting mixture was thoroughly stirred. The product thus obtained was used as the polycarbonate oligomer A (concentration: 317 g/L). The degree of polymerization of the polycarbonate oligomer thus obtained was 3 to 4.

(2) Synthesis of Polycarbonate Oligomer B 60 kg of bisphenol A and 0.58 kg of 1,1,1-tris(4hydroxyphenyl)ethane were dissolved in 400 L of a 54 aqueous sodium hydroxide solution to prepare an aqueous sodium hydroxide solution.

Thereafter, in the same manner as in (1) above, a polycarbonate oligomer (Polycarbonate Oligomer B) with a concentration of 321 g/L was obtained.

Preparation Example 1 (Preparation of Polycarbonate)

3.39 L of methylene chloride was added to 5.61 L of Polycarbonate Oligomer B to prepare Solution I.

Separately, 173.4 g of sodium hydroxide and 482.9 g of bisphenol A were dissolved in 2.9 L of water to prepare Solution II.

The above Solution I and Solution II were mixed, 0.856 g of triethylamine as catalyst and 37.6 g of p-tert-butylphenol as a terminal stopper were added thereto, and the mixture was stirred in a turbulent flow condition for 10 minutes at 600 rpm.

Thereafter, 167 ml of an aqueous sodium hydroxide solution (concentration: 48% by weight) was added, and the resulting mixture was reacted while stirring under a laminar flow condition for 60 minutes at 200 rpm.

After the reaction was completed, 5 L of water and 5 L of methylene chloride were added, and the mixture was separated into a methylene chloride layer and an aqueous layer. The methylene chloride layer was alkali-washed with a 0.01N aqueous sodium hydroxide solution, and further acid-washed with 0.1N hydrochloric acid.

Then, by washing with water, methylene chloride was removed to obtain polycarbonate as a polymer in flake form. The acetone-soluble matter of the flake-form polymer obtained was measured by Soxhlet extraction over 8 hours. The viscosity average molecular weight of the resulting polycarbonate was $2.7 \times 10^4$. The polycarbonate thus obtained is referred to as A-1.

Preparation Example 2 (Preparation of Polycarbonate)

To 5.68 L of Polycarbonate Oligomer A, 3.32 L of methylene chloride was added to prepare Solution III.

Solution III and Solution II used in Preparation Example 1 were mixed, 0.856 g of triethylamine as a catalyst, 37.6 g of p-tert-butylphenol as a terminal stopper and 15.0 g of 1,1,1-tris(4-hydroxyphenyl)ethane as a branching agent were added thereto, and the mixture were stirred under a turbulent flow condition for 10 minutes at 600 rpm.

Then, 167 ml of an aqueous sodium hydroxide solution (concentration: 48% by weight) was added thereto, and the reaction was conducted by stirring under a laminar flow condition for 60 minutes at 200 rpm.

When the reaction was completed, 5 L of water and 5 L of methylene chloride were added thereto, and a methylene chloride layer and an aqueous layer were separated. The methylene chloride layer was alkali-washed with a 0.01N aqueous sodium hydroxide solution, and then acid-washed with 0.01N hydrochloric acid.

Then, by washing with water, the methylene chloride was removed away, and a polymer in flake, that is, polycarbonate was obtained. The viscosity average molecular weight of the resulting polycarbonate was $2.7 \times 10^4$. This polycarbonate is referred to as A-2.

Preparation Example 3 (Preparation of Polycarbonate)

The procedure of Preparation Example 1 was repeated except that 53.2 g of p-cumylphenol was used in place of 37.6 g of p-tert-butylphenol. The viscosity average molecular weight of the resulting polycarbonate was $2.7 \times 10^4$. This polycarbonate is referred to as A-3.

Preparation Example 4 (Preparation of Polycarbonate)

The procedure of Preparation Example 1 was repeated except that 45.5 g of p-tert-butylphenol was used. The viscosity average molecular weight of the resulting polycarbonate was $2.1 \times 10^4$. This polycarbonate is referred to as A-4.

Examples 1 to 11 and Comparative Examples 1 to 5

Each prescirbed amount of polycarbonate, thermoplastic polyester resin and other additives was dried, and chip blended, then supplied to an extruder to be kneaded at 270° C., and pelletized. Further, the resulting pellet was dried at 120° C. for 6 hours, and injection-molded at a die temperature of 80° C. and a molding temperature of 270° C. to obtain a test piece.

The pellet was measured on melting properties (flow value, MIR, swell ratio, and melting intensity), and the test piece was measured on tensile strength and solvent resistance. The results are shown in Table 1-1 to Table 1-4.

TABLE 1-1

| | Polycarbonate | | Thermoplastic Polyester Resin | |
|---|---|---|---|---|
| | Kind | Ratio by Weight (wt %) | Kind | Ratio by Weight (wt %) |
| Example 1 | A-1 | 90 | PET*2 | 10 |
| Example 2 | A-2 | 90 | PET*2 | 10 |
| Example 3 | A-3 | 90 | PET*2 | 10 |
| Example 4 | A-1 | 70 | PET*2 | 30 |
| Example 5 | A-1 | 50 | PET*2 | 50 |
| Example 6 | A-1 | 30 | PET*2 | 70 |
| Example 7 | A-3 | 30 | PET*2 | 70 |
| Example 8 | A-1 | 70 | PBT*3 | 30 |
| Example 9 | A-1 | 30 | PBT*3 | 70 |
| Example 10 | A-4 | 90 | PET*2 | 10 |
| Example 11 | A-1 | 95 | PET*2 | 5 |

*1 Toughlon A-2700 (polycarbonate produced from bisphenol A) manufactured by Idemitsu Petrochemical Co., Ltd.
*2 Dianite MA523 (polyethylene terephthalate, intrinsic viscosity: 0.73 dl/g) manufactured by Mitsubishi Rayon Co., Ltd.
*3 Dulanex 2002 (polybutylene terephthalate, intrinsic viscosity: 1.06 dl/g), manufactured by Polyplastic Co., Ltd.

TABLE 1-2

| | Result of Evaluation | | | | | |
|---|---|---|---|---|---|---|
| | Tensile Strength (kg/cm$^2$) | Solvent Resistance | Flow Value (ml/sec) | MIR | Swell Ratio | Melt Tension (g) |
| Example 1 | 630 | 0.4 | $3.8 \times 10^{-2}$ | 78 | 2.52 | 6.5 |
| Example 2 | 630 | 0.4 | $3.8 \times 10^{-2}$ | 78 | 2.53 | 6.5 |
| Example 3 | 630 | 0.4 | $3.8 \times 10^{-2}$ | 77 | 2.50 | 6.4 |
| Example 4 | 620 | 0.5 | $4.4 \times 10^{-2}$ | 66 | 1.65 | 4.2 |
| Example 5 | 600 | 0.6 | $6.5 \times 10^{-2}$ | 64 | 1.62 | 3.9 |
| Example 6 | 580 | 0.7 | $8.9 \times 10^{-2}$ | 64 | 1.48 | 3.2 |
| Example 7 | 580 | 0.7 | $8.8 \times 10^{-2}$ | 65 | 1.48 | 3.3 |
| Example 8 | 630 | 0.5 | $3.2 \times 10^{-2}$ | 75 | 1.38 | 4.3 |
| Example 9 | 630 | 0.7 | $8.3 \times 10^{-2}$ | 68 | 1.39 | 2.8 |
| Example 10 | 630 | 0.4 | $8.2 \times 10^{-2}$ | 79 | 2.52 | 4.8 |
| Example 11 | 630 | 0.4 | $3.6 \times 10^{-2}$ | 82 | 2.54 | 6.8 |

TABLE 1-3

| | Polycarbonate | | Thermoplastic Polyester Resin | |
|---|---|---|---|---|
| | Kind | Ratio by Weight (wt %) | Kind | Ratio by Weight (wt %) |
| Comparative Example 1 | A-1 | 100 | — | — |
| Comparative Example 2 | B-1 | 100 | — | — |
| Comparative Example 3 | B-1 | 70 | PET | 30 |
| Comparative Example 4 | B-1 | 70 | PBT | 30 |
| Comparative Example 5 | B-2*[4] | 90 | PBT | 10 |

*[4]Toughlon A2200 (polycarbonate produced from bisphenol A) manufactured by Idemitsu Petrochemical Co., Ltd.

TABLE 1-4

| | Result of Evaluation | | | | | |
|---|---|---|---|---|---|---|
| | Tensile Strength (kg/cm$^2$) | Solvent Resistance | Flow Value (ml/sec) | MIR | Swell Ratio | Melt Tension (g) |
| Comparative Example 1 | 630 | 0.2 | $2.5 \times 10^{-2}$ | 75 | 2.75 | 6.9 |
| Comparative Example 2 | 630 | 0.2 | $2.2 \times 10^{-2}$ | 20 | 1.13 | 0.8 |
| Comparative Example 3 | 610 | 0.5 | $4.1 \times 10^{-2}$ | 30 | 1.18 | 1.5 |
| Comparative Example 4 | 620 | 0.5 | $1.8 \times 10^{-2}$ | 32 | 1.20 | 1.3 |
| Comparative Example 5 | 630 | 0.4 | $8.2 \times 10^{-2}$ | 25 | 1.12 | 0.8 |

Conditions of measuring melt properties, tensile strength, and solvent resistance are as follows.

1) Flow Value Measured according to JIS K-7210.

2) MIR (Index for blow molding. Desired value is 50 or higher.) Melt index ratio ($MI_{11 kg}/MI_{325 g}$). Measured at 280° C.

3) Swell ratio (indication of blow molding and the like. Desired value is 1.2 or higher.)

Value obtained by dividing a cross-sectional area of a strand extruded when a load of 11 kg is applied to a molten resin in measurement of melt index, by a cross-sectional area of an orifice.

4) Melt Tension (Indication of blow molding and the like. Desired value is 2 (g) or higher.) Tension of strand resulted at a tensile rate of 9.42 re/min., Orifice: L/D=8/21 was measured at 280° C.

5) Tensile Strength (kg/cm$^2$) Measured according to JIS K-7113.

6) Solvent Resistance

Determined by critical strain in ratio by volume, in a solvent (ratio of composition: toluene/isooctane=40/60), according to the ¼ oval method described in Nakatsuji et al. "Shikizai" vol. 39, page 455 (1966).

Examples 12 to 23

A polycarbonate and a thermoplastic polyester resin were dried at 120° C. for 6 hours. These two dried materials, a green rubber elastomer and other additives each in a prescribed amount were subjected to dry-blending according to the mixing composition shown in Table 1-5. The resultant mixture was fed to an extruder, kneaded at 270° C. and pelletized. The so obtained pellets were dried at 120° C. for 6 hours and then subjected to injection under the conditions of a die temperature of 80° C. and a molding temperature of 270° C. to obtain test pieces.

The pellets were measured for the melt properties (the flow value, the swell ratio and the melt tension), while the test pieces were examined relative to the tensile strength, the Izod impact strength and the solvent resistance. The results thereof are given in Table 1-6.

TABLE 1-5

| | Mixing Composition (wt. %) | | | | | |
|---|---|---|---|---|---|---|
| | PC | | PET | | Rubber Elastomer | |
| | Kind | Mixed amount | Kind | Mixed amount | Kind | Mixed amount |
| Example 12 | A-1 | 70 | PET | 25 | G-1 | 5 |
| Example 13 | A-2 | 70 | PET | 25 | G-1 | 5 |
| Example 14 | A-3 | 70 | PET | 25 | G-1 | 5 |
| Example 15 | A-4 | 70 | PET | 25 | G-1 | 5 |
| Example 16 | A-1 | 50 | PET | 45 | G-1 | 5 |
| Example 17 | A-1 | 60 | PET | 25 | G-1 | 15 |
| Example 18 | A-1 | 70 | PET | 25 | G-1 | 5 |

TABLE 1-5-continued

| | Mixing Composition (wt. %) | | | | | |
|---|---|---|---|---|---|---|
| | PC | | PET | | Rubber Elastomer | |
| | Kind | Mixed amount | Kind | Mixed amount | Kind | Mixed amount |
| Example 19 | A-1 | 60 | PET | 25 | G-1 | 15 |
| Example 20 | A-1 | 70 | PET | 25 | G-2 | 5 |
| Example 21 | A-1 | 60 | PET | 25 | G-2 | 15 |
| Example 22 | A-1 | 70 | PBT | 25 | G-2 | 5 |
| EXample 23 | A-1 | 45 | PBT | 35 | G-2 | 20 |

TABLE 1-6

| | Physical properties | | | |
|---|---|---|---|---|
| | Tensile strength | Izod impact strength*1 | | Critical strain |
| | kg/m$^2$ | 23° C. | −30° C. | % |
| Example 12 | 600 | 90 | 20 | 0.5 |
| Example 13 | 600 | 90 | 20 | 0.5 |
| Example 14 | 600 | 90 | 20 | 0.5 |
| Example 15 | 600 | 90 | 20 | 0.5 |
| Example 16 | 550 | 80 | 15 | 0.6 |
| Example 17 | 530 | 70 | 30 | 0.6 |
| Example 18 | 650 | 85 | 18 | 0.6 |
| Example 19 | 580 | 68 | 25 | 0.7 |
| Example 20 | 580 | 85 | 35 | 0.5 |
| Example 21 | 480 | 68 | 50 | 0.6 |
| Example 22 | 620 | 80 | 30 | 0.6 |
| Example 23 | 530 | 65 | 48 | 0.8 |

| | Physical properties | | |
|---|---|---|---|
| | Flow value ml/sec | Swell ratio | Melt tension g |
| Example 12 | 4.5 × 10$^{-2}$ | 1.65 | 4.0 |
| Example 13 | 4.5 × 10$^{-2}$ | 1.65 | 4.0 |
| Example 14 | 4.5 × 10$^{-2}$ | 1.66 | 4.1 |
| Example 15 | 12 × 10$^{-2}$ | 1.64 | 3.0 |
| Example 16 | 6.8 × 10$^{-2}$ | 1.58 | 3.8 |
| Example 17 | 5.0 × 10$^{-2}$ | 1.40 | 3.7 |
| Example 18 | 3.5 × 10$^{-2}$ | 1.35 | 4.2 |
| Example 19 | 4.0 × 10$^{-2}$ | 1.30 | 3.8 |
| Example 20 | 4.8 × 10$^{-2}$ | 1.70 | 4.2 |
| Example 21 | 5.5 × 10$^{-2}$ | 1.44 | 3.9 |
| Example 22 | 3.8 × 10$^{-2}$ | 1.38 | 4.4 |
| Example 23 | 5.0 × 10$^{-2}$ | 1.33 | 3.6 |

Furthermore, the melt properties, the tensile strength, the Izod impact strength and the solvent resistance were determined under the following conditions:

1) Flow value

Measured according to JIS K-7210.

2) Swell ratio (an indication of blow molding; and preferably a value of 1.2 or higher)

Determined by dividing a cross-sectional area of a strand extruded under the following conditions by a cross-sectional area of an orifice with the use of & capillary rheometer.

Extruding Conditions

Capillary L/D 20, D 1 mm $\phi$
Temperature 280° C.
Shear rate 243 cm$^{-1}$

3) Melt tension (an indication of blow molding and the like; preferably 2 (g) or more)

The tension was developed on a strand under the conditions of a stress rate of 9.42 m/min and an orifice of L/D=8/21. The so developed tension was measured at 280° C.

4) Tensile strength

Measured according to JIS K-7113.

5) Izod impact strength $\frac{1}{8}$ in notched. Measured according to JIS K-7110.

6) Solvent resistance

The critical strain (the minimum strain capable of developing cracks) was determined with the use of a solvent (toluene/isooctane=40/60) according to the $\frac{1}{4}$ oval method.

Furthermore the following materials were used in the examples and the comparative examples:

(B-1): A conventional polycarbonate resin known as "TOUGHLON A2700" (supplied by Idemitau Petrochemical Co., Ltd.)

(PET): A polyethylene terephthalate known as "DIANITE MA523" (supplied by Mitsubishi Rayon Co., Ltd.)

(PBT): A polybutylene terephthalate as "DULANEX 2002" (supplied by Polyplastic Co., Ltd.)

(G-1): A rubber-like elastomer MAS as "PARALOID KM330" (supplied by Rhome & Haas Co.)

(G-2): A rubber-like elastomer MBS as "METABLEN C223" (supplied by Mitsabishi Rayon Co. Ltd.)

What is claimed is:

1. A polycarbonate resin composition consisting essentially of (A) 30 to 98% by weight of a branched polycarbonate having a branched nucleus structure derived from a branching agent represented by the formula (I):

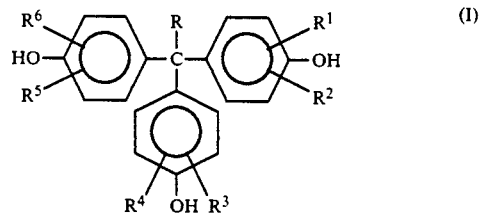

wherein R is a hydrogen atom or an alkyl group having 1 to 5 carbon atoms, and $R^1$ to $R^6$ are hydrogen atoms, alkyl groups having 1 to 5 carbon atoms or halogen atoms, respectively, the branched polycarbonate having a viscosity average molecular weight of 15,000 to 40,000, and an acetone-soluble matter of not more than 3.5% by weight, and (B) 70 to 2% by weight of polybutylene terephthalate resin.

2. The polycarbonate resin composition according to claim 1 wherein the branched polycarbonate is represented by the formula:

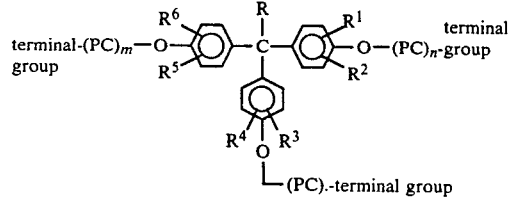

wherein m, n, and o are integers, respectively, and PC indicate a polycarbonate moiety.

3. The polycarbonate resin composition according to claim 2 wherein the polycarbonate is made from bisphenol A.

4. The polycarbonate resin composition according to claim 2 wherein the polycarbonate has a repeating unit represented by the formula:

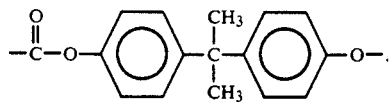

5. The polycarbonate resin composition according to claim 1 wherein the branching agent is 1,1,1-tris(4-hydroxyphenyl)ethane.

6. A polycarbonate resin composition consisting essentially of (A) 40 to 94% by weight of a branched polycarbonate having a branched nucleus structure derived from a branching agent represented by the formula (I):

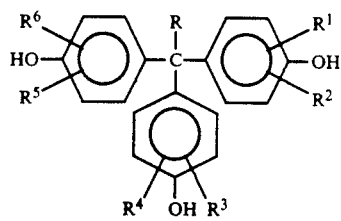

wherein R is a hydrogen atom or an alkyl group having 1 to 5 carbon atoms, and $R^1$ and $R^6$ are hydrogen atoms, alkyl groups having 1 to 5 carbon atoms or halogen atoms, respectively, the branched polycarbonate having a viscosity average molecular weight of 15,000 to 40,000, and an acetone-soluble matter of not more than 3.5% by weight, and (B) 5 to 59% by weight of a polybutylene terephthalate resin and 1 to 50% by weight of a rubber elastomer as a component (C), the total amount of the component (A), the component (B) and the component (C) being 100% by weight.

7. The polycarbonate resin composition according to claim 6, wherein component (A) is in an amount of 45 to 80% by weight, component (B) is in an amount of 10 to 40% by weight and component (C) is in an amount of 3 to 30% by weight, the total amount of the component (A), the component (B) and the component (C) being 100% by weight.

8. The polycarbonate resin composition according to claim 7, wherein the branching agent is 1,1,1-tris(4-hydroxyphenyl)ethane.

* * * * *